United States Patent
Fujimoto et al.

(10) Patent No.: US 10,494,046 B2
(45) Date of Patent: Dec. 3, 2019

(54) BRACKET COVER

(71) Applicant: Shimano Inc., Sakai, Osaka (JP)

(72) Inventors: Naoki Fujimoto, Osaka (JP);
Yoshimitsu Miki, Osaka (JP); Yasuhisa Watanabe, Osaka (JP); Yasuyuki Komada, Osaka (JP)

(73) Assignee: Shimano Inc., Osaka (JP)

( * ) Notice: Subject to any disclaimer, the term of this patent is extended or adjusted under 35 U.S.C. 154(b) by 91 days.

(21) Appl. No.: 15/483,584

(22) Filed: Apr. 10, 2017

(65) Prior Publication Data
US 2017/0210438 A1 Jul. 27, 2017

Related U.S. Application Data

(62) Division of application No. 15/059,772, filed on Mar. 3, 2016.

(30) Foreign Application Priority Data

Mar. 9, 2015 (JP) .................................. 2015-045921
Oct. 9, 2015 (JP) .................................. 2015-201548

(51) Int. Cl.
*B62J 23/00* (2006.01)

(52) U.S. Cl.
CPC .................................. *B62J 23/00* (2013.01)

(58) Field of Classification Search
CPC .......... B62J 23/00; B62K 23/06; B62K 21/26; B62L 3/02; B62M 25/06
USPC ...................................................... 280/304.3
See application file for complete search history.

(56) References Cited

U.S. PATENT DOCUMENTS

| 5,022,572 | A | 6/1991 | Brown | |
| 5,740,700 | A | 4/1998 | Redmond | |
| 9,027,433 | B2 * | 5/2015 | Dal Pra' | B62K 23/06 74/502.2 |
| 2008/0210043 | A1 * | 9/2008 | De Perini | B62K 23/02 74/502.2 |
| 2015/0353164 | A1 * | 12/2015 | Sala | B62K 23/06 74/522 |
| 2017/0015377 | A1 | 1/2017 | Feuerstein | |

FOREIGN PATENT DOCUMENTS

| JP | 10-316073 A | 12/1998 |
| JP | 2014-15121 A | 1/2014 |

* cited by examiner

*Primary Examiner* — Tony H Winner
*Assistant Examiner* — Felicia L. Brittman
(74) *Attorney, Agent, or Firm* — Global IP Counselors, LLP

(57) ABSTRACT

A bracket cover is configured to cover at least a portion of a bracket that is attachable to a handlebar of a bicycle. The bracket cover includes a cover main body, a first fixing member and a second fixing member. The cover main body includes a portion having a first edge portion and a second edge portion. The portion is between the first and second edge portions being an elastic material. The first fixing member is configured to detachably fix the cover main body to a first side surface of an outer perimeter portion of the bracket at the first edge portion. The second fixing member is configured to detachably fix the cover main body to a second side surface of an outer perimeter portion of the bracket at the side edge portion. The first and second fixing member are separate members from the cover main body.

17 Claims, 13 Drawing Sheets

BRACKET COVER

CROSS-REFERENCE TO RELATED APPLICATIONS

This application is a divisional application of U.S. patent application Ser. No. 15/059,772 filed on Mar. 3, 2016. This application claims priority to Japanese Patent Application No. 2015-045921, filed on Mar. 9, 2015, and Japanese Patent Application No. 2015-201548, filed on Oct. 9, 2015. The entire disclosures of Japanese Patent Application No. 2015-045921, filed on Mar. 9, 2015, and Japanese Patent Application No. 2015-201548 are hereby incorporated herein by reference.

BACKGROUND

Field of the Invention

The present invention generally relates to a cover. In particular, the present invention relates to a bracket cover for covering a bracket of a bicycle brake lever.

Background Information

In a brake lever that is attached to a drop handlebar, there are cases in which the user operates the brake lever by gripping the bracket. An attaching portion is provided on one end of the bracket for attaching to the handlebar, and a brake lever is provided on the other end. The bracket is covered by a bracket cover, which is made using a soft material having elasticity, such as synthetic rubber (see, for example, Japanese Laid-Open Patent Publication No. 1998-316073). In this type of bracket cover, there are cases in which working is carried out with the surface of the bracket exposed. The bracket cover is attached and detached by folding a tubular shaped portion from one end towards the other end while pulling and stretching the bracket cover.

SUMMARY

In a conventional bracket cover, since it is necessary to fold for attaching detaching the bracket cover, the bracket cover cannot be easily attached to and detached from the bracket.

An object of the present invention is to make a bracket cover that can be easily attached to and detached from a bracket.

A bracket cover according to the present invention is a bracket cover that is configured to cover at least a portion of a bracket that is attachable to a handlebar of a bicycle. The bracket cover includes a cover main body, a first fixing member and a second fixing member. The cover main body includes a portion having a first edge portion and a second edge portion. The portion is between the first and second edge portions being an elastic material. The first fixing member is configured to detachably fix the cover main body to a first side surface of an outer perimeter portion of the bracket at the first edge portion. The second fixing member is configured to detachably fix the cover main body to a second side surface of an outer perimeter portion of the bracket at the side edge portion. The first and second fixing member are separate members from the cover main body.

BRIEF DESCRIPTION OF THE DRAWINGS

Referring now to the attached drawings which form a part of this original disclosure.

DETAILED DESCRIPTION OF THE EMBODIMENTS

Figure 1:
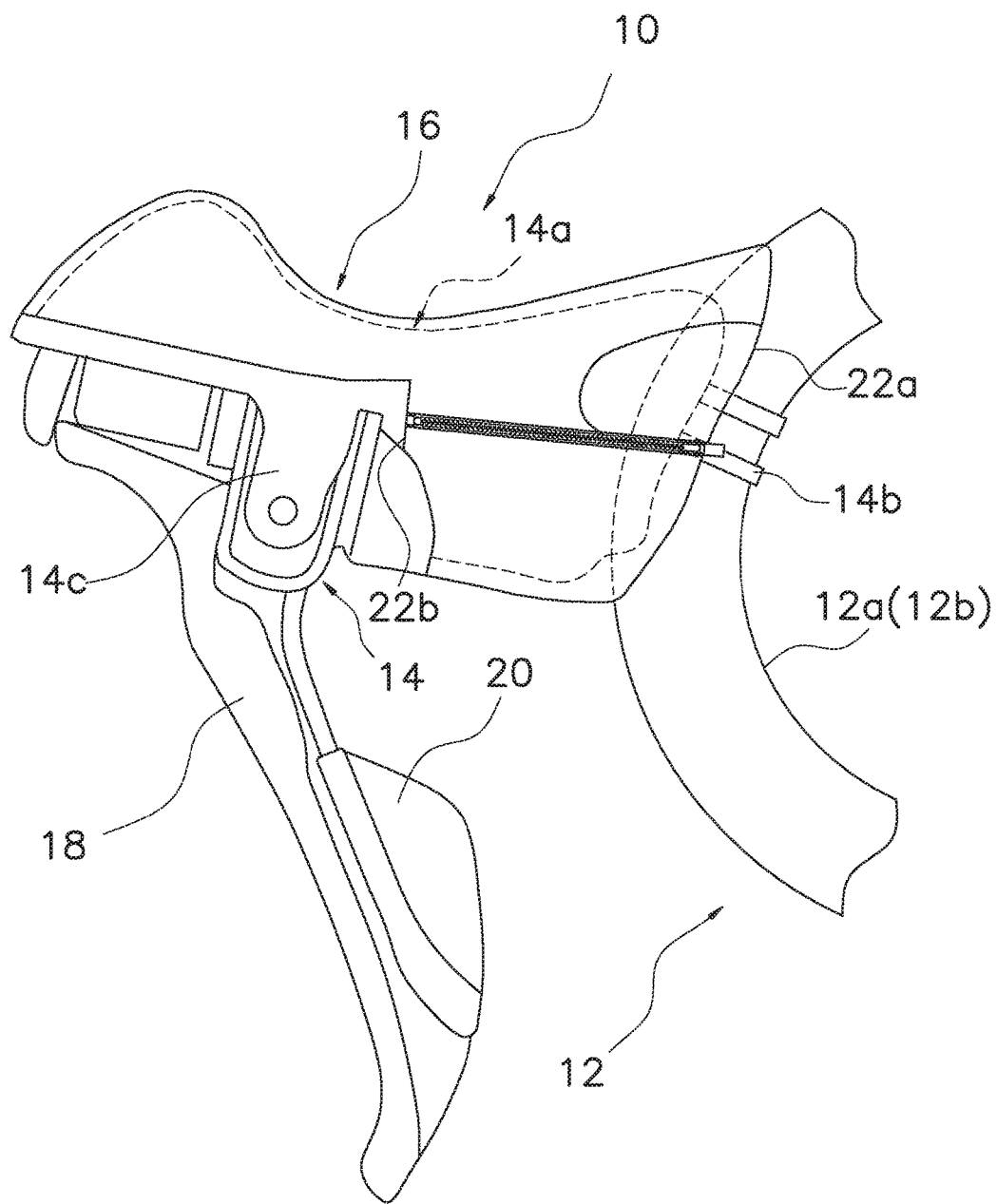
FIG. 1 is a side elevational view of an operating device that employs a bracket cover according to a first embodiment.

Referring to FIG. 1, an operating device 10 is illustrated for a bicycle. The operating device 10 includes a bracket 14 with a bracket cover 16 according to a first embodiment disposed on the bracket 14. The operating device 10 is attached, is attached to a drop handlebar 12 of a bicycle. The operating device 10 is at least used for operating a brake device. In the following embodiments, the operating device 10 can also operate a gear shifting device. Meanwhile, in the following explanations, front and rear, left and right, and upper and lower mean the front and rear, left and right, and upper and lower, as seen from the user in a state in which the user is sitting on a saddle (not shown) of the bicycle facing the handlebar 12.

The operating device 10 is attachable to the drop handlebar 12 as seen in FIG. 1. The handlebar 12 comprises a right curved portion 12a and a left curved portion 12b, which are curved in a U shape, on the two ends. In a state in which the handlebar 12 is mounted on the bicycle, the right curved portion 12a and the left curved portion 12b curve towards the front of the bicycle, and then extend towards the rear of the bicycle. In FIG. 1, the operating device 10 is mounted on the right curved portion 12a as shown. The operating device (not shown) that is mounted on the left curved portion 12b is bilaterally symmetric in shape with the operating device 10.

In addition to the bracket 14 and the bracket cover 16, as mentioned above, the operating device 10 further comprises a brake lever 18, a shift lever 20, and a cable operating mechanism. The bracket 14 is attached to the right curved portion 12a of the handlebar 12. The bracket cover 16 is disposed on the bracket 14 according to the first embodiment of the present invention. The cable operating mechanism is configured for carrying out a gear shifting operation, which is not shown.

The bracket 14 comprises a bracket main body 14a, and an attaching portion 14b for attaching the bracket main body 14a to the right curved portion 12a. In the front portion of the bracket main body 14a, a swing support portion 14c is provided. The swing support portion 14c pivotally supports the brake lever 18 in a front and rear direction (left and right direction in FIG. 1). The brake lever 18 is also pivotally arranged in a left and right direction (a direction orthogonal to the paper surface in FIG. 1). The shift lever 20 is pivotally supported to the bracket main body 14a in a left and right direction. The brake lever 18 and the shift lever 20 are connected to a brake device and a gear shifting device with respective control cables.

Figure 2:
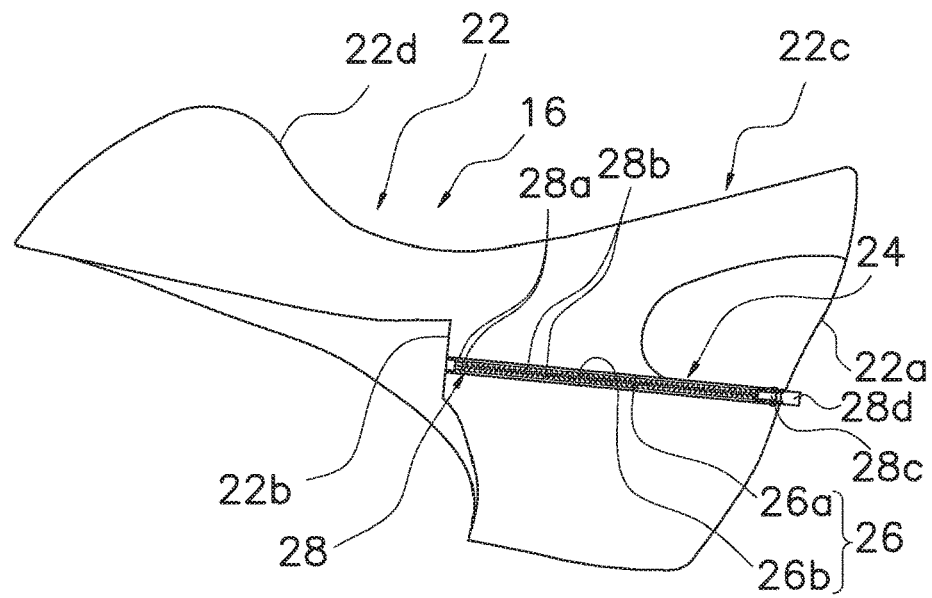
FIG. 2 is a side elevational view of the bracket cover according to the first embodiment.

The bracket cover 16 is attachable to the bracket main body 14a. The bracket cover 16 covers at least a portion of the bracket main body 14a. In the first embodiment, the bracket cover 16 is formed to substantially cover the bracket main body 14a. As shown in FIG. 2, the bracket cover 16 comprises a cover main body 22 and a coupling mechanism 24. The cover main body 22 comprises an elastic material such as synthetic resin, including synthetic rubber. The cover main body 22 has a first end portion 22a and a second end portion 22b. The cover main body 22 comprises a first portion 22c and a second portion 22d. The first portion 22c is formed in a tubular shape between the first end portion 22a and the second end portion 22b. The second portion 22d is disposed at a front of the second end portion 22b. The second portion 22d covers a front portion of the bracket main body 14a from above. In a state in which the bracket cover 16 is attached to the bracket 14, the first end portion 22a is disposed on a rear side in the front and rear direction of a bicycle with respect to the second end portion 22b. That is, the first end portion 22a is disposed on an end of bracket main body 14a with the attaching portion 14b, and the second end portion 22b is disposed on an end of the bracket main body 14a with the brake lever 18 and the shift lever 20. The cover main body 22 is fixedly attached to the outer perimeter portion of the bracket main body 14a.

The cover main body 22 comprises an openable and closable opening part 26 in the first portion 22c. The opening part 26 is formed on a face that faces inward in the left and right direction of a bicycle, in a state in which the bracket cover 16 is attached to the bracket 14. The opening part 26 extends from at least one of the first end portion 22a and the second end portion 22b to form a first edge portion 26a and a second edge portion 26b. In the first embodiment, the opening part 26 extends from the first end portion 22a so as to reach the second end portion 22b. This type of opening part 26 can extend form either the first end portion 22a or the second end portion 22b so as not to reach the other of the first end portion 22a and the second end portion 22b. Additionally, it can be formed to extend as far as the second portion 22d.

The coupling mechanism 24 couples the first edge portion 26a and the second edge portion 26b. The coupling mechanism 24 comprises a zipper 28. The zipper 28 comprises a pair of tape-shaped base members 28a, a plurality of elements 28b, a slider 28c and a handle 28d. The base members 28a extend from the first end portion 22a so as to reach the second end portion 22b. Each of the base members 28a is fixed to the first edge portion 26a and the second edge portion 26b. The elements 28b are formed in a teeth shape such that the elements engage with each other, and lined up and fixed to each of the base members 28a. The slider 28c is movably engaged with the elements 28b so as to be capable of engaging and disengaging the elements 28b. The handle 28d is pivotally provided to the slider 28c. The handle 28d can be provided detachably from the slider 28c.

Figure 3:
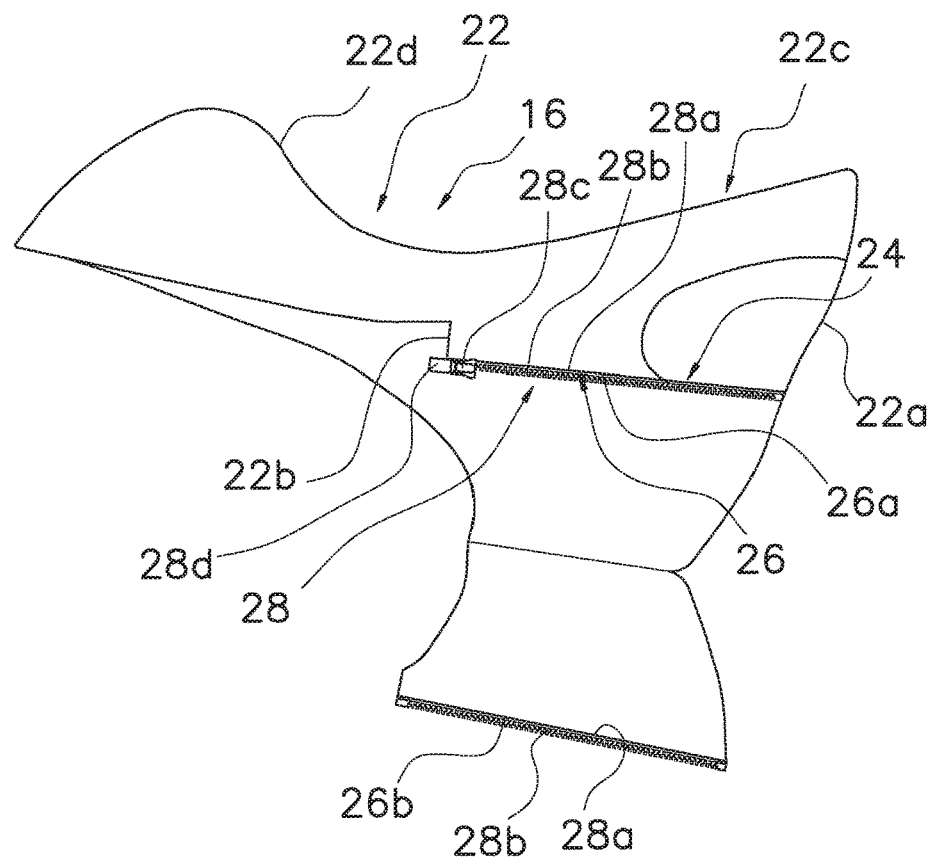
FIG. 3 is a side elevational view of the bracket cover according to the first embodiment with a coupling mechanism of the bracket cover in a decoupled state.

In the bracket cover 16 that is configured as the above, when the user detaches the bracket cover 16, the user holds the handle 28d and moves the slider 28c from the first end portion 22a to the second end portion 22b, in a state in which the opening part 26 is closed, as shown in FIG. 2. Once the slider 28c moves to the second end portion 22b, all the elements 28b are disengaged. As shown in FIG. 3, as a result, the user can easily open the opening part 26, so as to separate the first edge portion 26a and the second edge portion 26b. Accordingly, the user can easily detach the bracket cover 16. Additionally, the outer perimeter surface of the bracket main body 14a can be exposed, and the user can easily carry out maintenance of the operating device 10.

Additionally, when the user attaches the bracket cover 16, the user places the bracket cover 16 on the bracket main body 14a. Then, the user wraps the first portion 22c onto the bracket main body 14a. With the above, the elements 28b is aligned at the second end portion 22b. Then, with the elements 28b being aligned, the elements 28b are engaged with the slider 28c by the handle 28d being held by a user, and the slider 28c being moved to the first end portion 22a. Once the slider 28c moves to the first end portion 22a, all of the elements 28b are engaged. With the above, the user can easily close the opening part 26. At this time, the first portion 22c of the cover main body 22 is stretched in a circumferential direction and fixedly attached to the bracket main body 14a by the coupling mechanism 24.

Here, the user can attach/detach the bracket cover 16 to/from the bracket main body 14a in one motion, easily, and rapidly, by holding the handle 28d and moving the slider 28c of the zipper 28.

First Modification of the First Embodiment

In the following explanations, regarding configurations that correspond to the configuration of the first embodiment, the reference symbols of the first embodiment are shown with three-digit reference symbols with the same last two digits, and configurations that are the same as the configuration of the first embodiment will be shown with the same reference symbols. Regarding the members with the same reference symbols, the explanations thereof are omitted.

Figure 4:
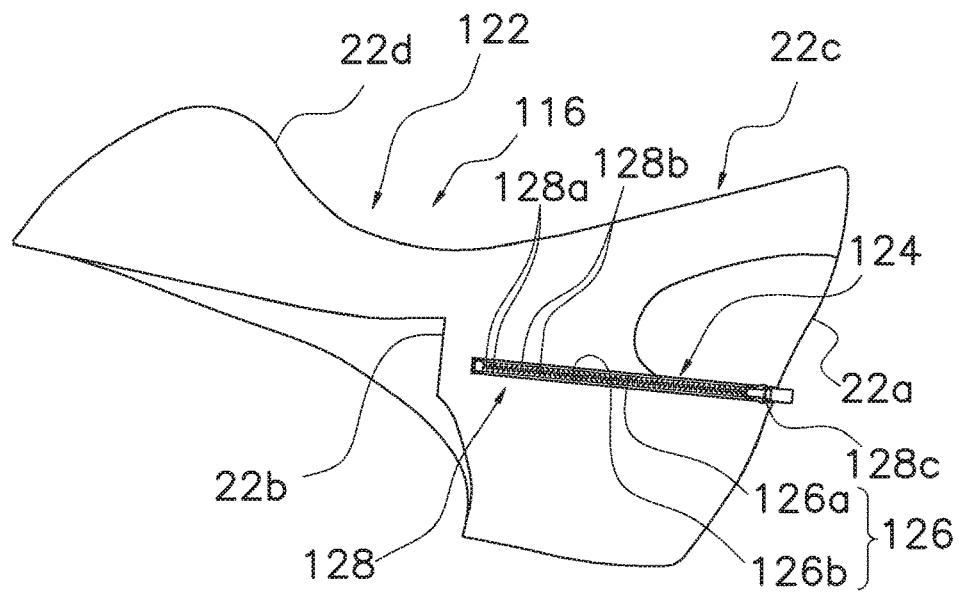
FIG. 4 is a side elevational view, corresponding to FIG. 2 of the first embodiment, of a bracket cover according to a first modification of the first embodiment.
Figure 5:
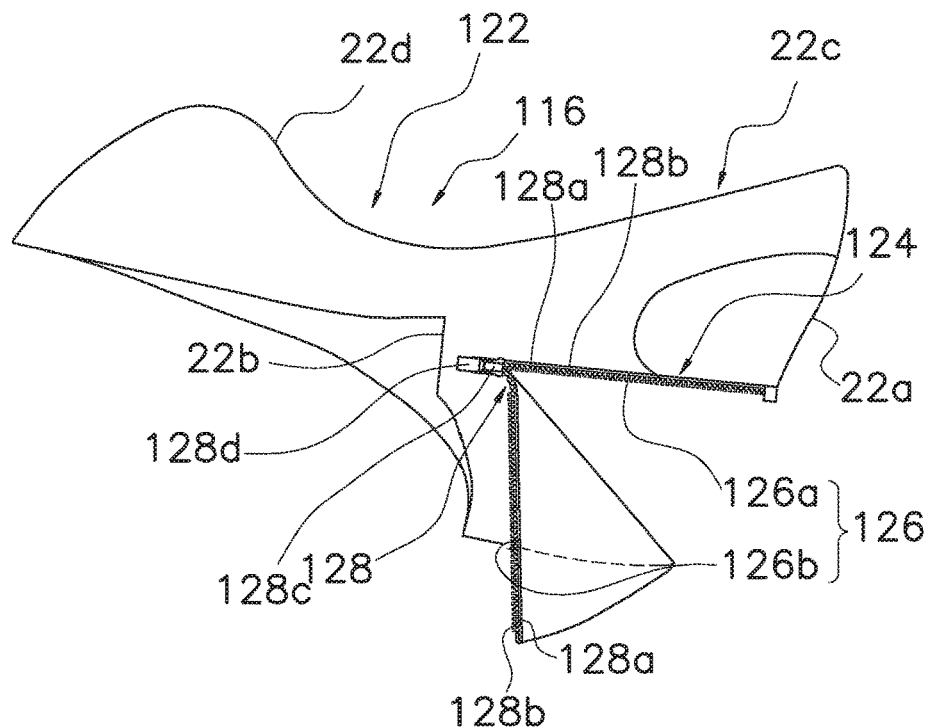
FIG. 5 is a side elevational view, corresponding to FIG. 3 of the first embodiment, of the bracket cover according to the first modification of the first embodiment.

As shown in FIGS. 4 and 5, in the first modification, in a bracket cover 116, an opening part 126 of a cover main body 122 extends from the first end portion 22a so as not to reach the second end portion 22b. Therefore, two base members 128a of a zipper 128, a first edge portion 126a, and a second edge portion 126b also extend from the first end portion 22a so as not to reach the second end portion 22b. The other configurations of the bracket cover 116 are the same as the first embodiment, so the explanations thereof are omitted.

In a bracket cover 116 of the first modification that is configured as the above, when the user detaches the bracket cover 116, the user moves the slider 128c from the first end portion 22a towards the second end portion 22b, in a state in which the opening part 126 is closed, as shown in FIG. 4. The slider 128c stops prior to reaching the second end portion 22b. As shown in FIG. 5, as a result, the user can easily open the opening part 26, in a state in which the first edge portion 126a and the second edge portion 126b are separated at the first end portion 22a, and not separated on the side with the second end portion 22b. Accordingly, the user can easily detach the bracket cover 116 from the bracket main body 14a just by slightly stretching the first portion 22c at the side with the second end portion 22b. Additionally, the outer perimeter surface of the bracket main body 14a can be exposed, and the user can easily carry out maintenance of the operating device 10.

Additionally, when the user attaches the bracket cover 116, the user slightly stretches the first portion 22c at the side with the second end portion 22b of the bracket cover 116 to attach the cover to the bracket main body 14a. Then, the user moves the slider 128c to the first end portion 22a. Once the slider 128c moves to the first end portion 22a, all of the elements 128b are engaged. With the above, the user can easily close the opening part 26. At this time, the first portion 22c of the cover main body 22 is stretched in the circumferential direction and fixedly attached to the bracket main body 14a by the coupling mechanism 24.

In the first modification, the bracket cover 116 can be attached to and detached from the bracket main body 14a in one motion, easily, and rapidly, by pulling the slider 128c of the zipper 128.

Second Modification of the First Embodiment

Figure 6:
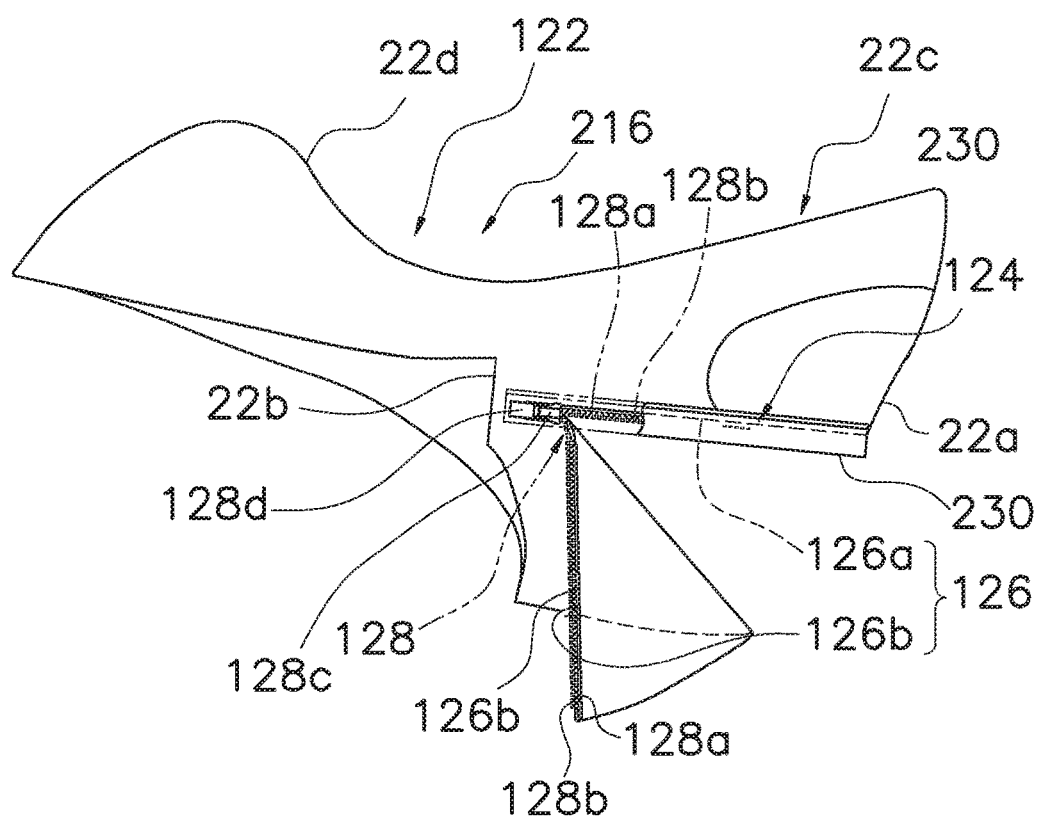
FIG. 6 is a side elevational view, corresponding to FIG. 5 of the first modification of the first embodiment, of a bracket cover according to a second modification of the first embodiment.

As shown in FIG. 6, a bracket cover 216 of the second modification further comprises a cover member 230 for covering an opening part 126. In the second modification, the cover member 230 is added to the bracket cover 116 of the first modification. In the second modification, the same configurations as the first embodiment or the first modification are given the same reference symbols, and the descriptions thereof are omitted.

The cover member 230 is configured to cover a zipper 128 and a first edge portion 126a of a coupling mechanism 124 at an opening part 126. FIG. 6 is drawn with the slider 128c side of the cover member 230 cut away. The cover member 230 is a member comprising flexibility, such as cloth, an elastic body, or synthetic resin made. The cover member 230 is fixed to a first portion 22c of a cover main body 122 by an appropriate fixing means, such as bonding, welding, or sewing, upward of the first edge portion 126a.

In a bracket cover 216 according to the second modification of the above configuration, the opening part 126 can be covered by the cover member 230. Accordingly, fingers do not directly contact the opening part 126 when the user grips the bracket cover 216 with a hand. Accordingly, a feeling of use similar to a conventional one can be given to the user when gripping the bracket cover 216.

Third Modification of the First Embodiment

Figure 7:
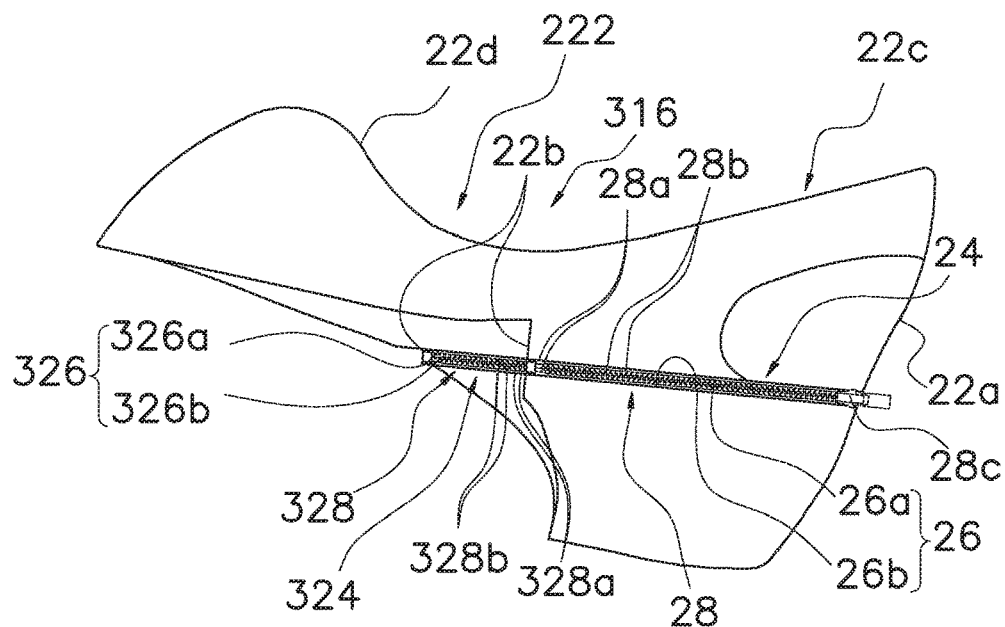
FIG. 7 is a side elevational view, corresponding to FIG. 2 of the first embodiment, of a bracket cover according to a third modification of the first embodiment.
Figure 8:
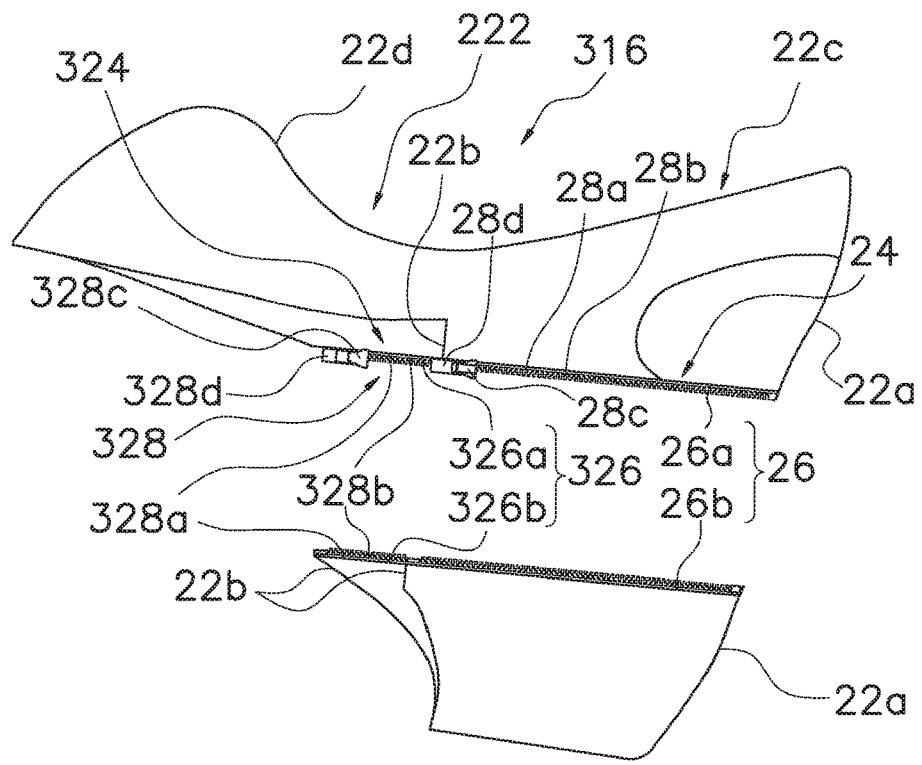
FIG. 8 is a side elevational view, corresponding to FIG. 3 of the first embodiment for a bracket cover according to the third modification of the first embodiment.

As shown in FIGS. 7 and 8, in a bracket cover 316 of the third modification of the first embodiment, a cover main body 222 further covers an additional opening part 326. Additionally, the bracket cover 316 further comprises an additional coupling mechanism 324. In the third modification, the additional opening part 326 and the additional coupling mechanism 324 are added to the bracket cover 16 of the first embodiment. The configurations except for those of the additional opening part 326 and the additional coupling mechanism 324 are the same as the first embodiment, so the explanations thereof are omitted.

The additional opening part 326 forms a third edge portion 326a and a fourth edge portion 326b, and extends from a first end portion 22a so as to reach a second end portion 22b. The additional opening part 326 is formed on a face that faces outward in the left and right direction of a bicycle. In the third modification, the additional opening part 326 is disposed at a position bilaterally symmetric to an opening part 26. However, the additional opening part 326 can be disposed to a position not bilaterally symmetric to the opening part 26. Additionally, in the third modification, the third edge portion 326a and the fourth edge portion 326b are longer than the first edge portion 26a and the second edge portion 26b. However, the above can be equal or the other way around, as well.

The additional coupling mechanism 324 comprises a zipper 328; the zipper 328 is of the same configuration as the zipper 28, but the length of a base member 328a is longer than the length of the base member 28a. Additionally, the number of elements 328b is larger than the number of elements 28b. However, the above can be equal or the other way around, as well. A slider 328c and a handle 328d are disposed so as to face outward in the left and right direction of a bicycle. Therefore, the cover main body 322 of the third modification can be separated into two members by the coupling mechanism 24 and the additional coupling mechanism 324.

In the third modification of the above configuration, since the third edge portion 326a and the fourth edge portion 326b can be coupled by the additional coupling mechanism 324, the bracket cover 316 can be more easily attached to and detached from the bracket main body 14a.

Second Embodiment

Figure 9:
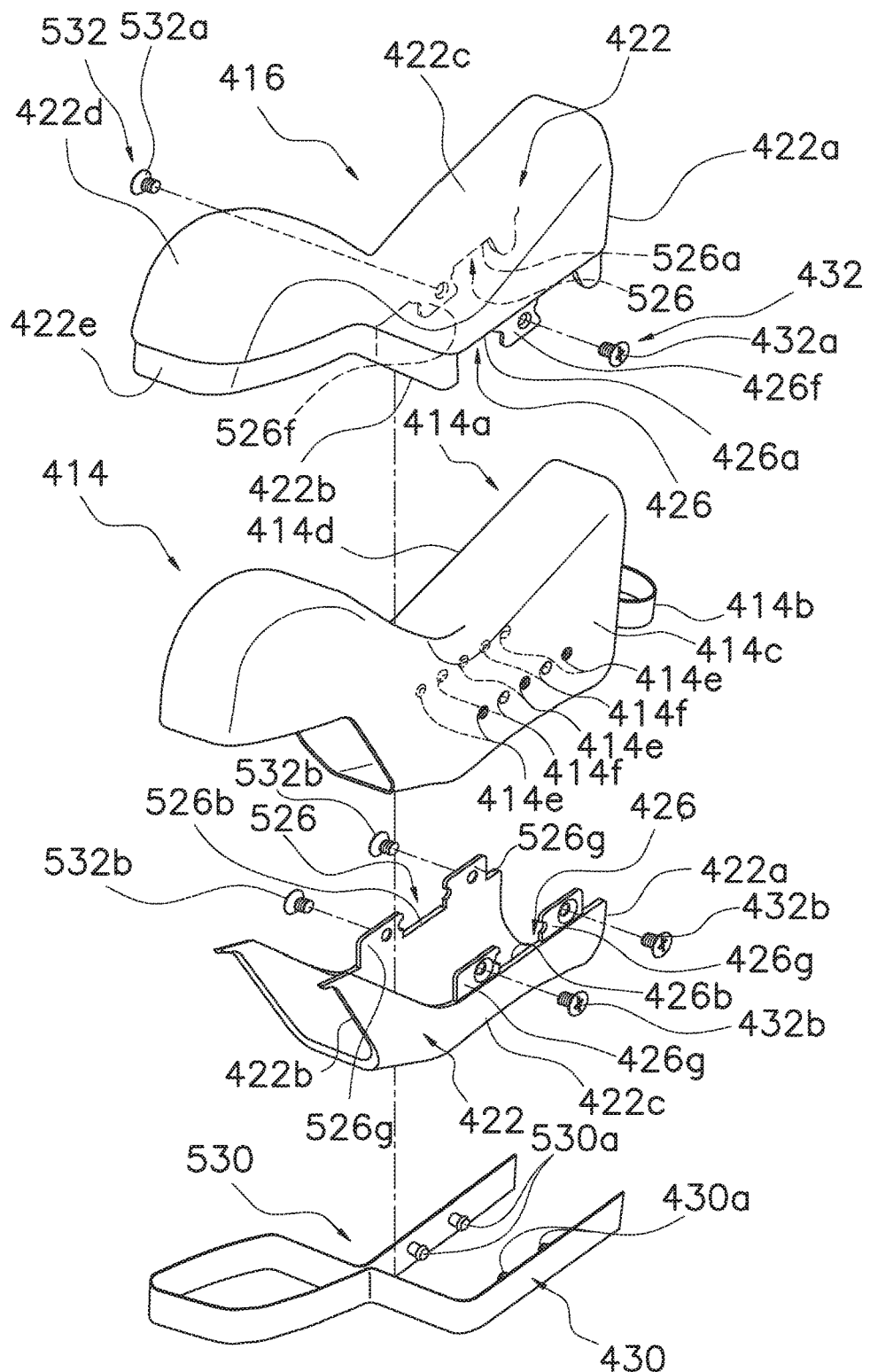
FIG. 9 is an exploded perspective view of a bracket cover according to a second embodiment.

As shown in FIG. 9, a bracket 414 according to the second embodiment comprises a bracket main body 414a and an attaching portion 414b. The bracket main body 414a comprises a plurality (for example, three) of screw holes 414e. The screw holes 414e are disposed side-by-side in a front and rear direction, and are disposed on a right side surface 414c and a left side surface 414d. Additionally, the bracket main body 414a comprises a plurality (for example, two) of positioning holes 424e formed between the screw holes 414e on the right side surface 414c and the left side surface 414d.

A bracket cover 416 is attachable to the bracket main body 414a, and covers at least a portion of the bracket main body 414a. In the second embodiment, the bracket cover 416 is formed to substantially cover the bracket main body 414a. As shown in FIG. 2, the bracket cover 416 comprises a cover main body 422, a fixing mechanism 432, an additional fixing mechanism 532, a cover member 430, and an additional cover member 530. The cover main body 422 comprises an elastic material such as synthetic resin, including synthetic rubber. The cover main body 422 has a first end portion 422a and a second end portion 422b. The cover main body 422 comprises a first portion 422c and a second portion 422d. The first portion 422c is formed in a tubular shape between the first end portion 422a and a second end portion 422b. The second portion 422d is disposed at a front of the second end portion 422b. The second portion 422d covers the front portion of the bracket main body 414a from above. In a state in which the bracket cover 416 is attached to the bracket 414, the first end portion 422a is disposed on a rear side in the front and rear direction of a bicycle with respect to the second end portion 422b. That is, the first end portion 422a is disposed on an end of the bracket main body 414a with the attaching portion 414b. The cover main body 422 is fixedly attached to the outer perimeter portion of the bracket main body 414a.

The cover main body 422 comprises an openable and closable opening part 426 and an additional opening part 526 in the first portion 422c. The opening part 426 is formed on a face that faces inward in the left and right direction of a bicycle, in a state in which the bracket cover 416 is attached to the bracket 414. The additional opening part 526 is formed on a face that faces outward in the left and right direction of a bicycle, in a state in which the bracket cover 416 is attached to the bracket 414. The opening part 426 extends from at least one of the first end portion 422a and the second end portion 422b to form a first edge portion 426a and a second edge portion 426b. The additional opening part 526 extends from at least one of the first end portion 422a and the second end portion 422b to form a third edge portion 526a and a fourth edge portion 526b. In the second embodiment, the opening part 426 and the additional opening part 526 extend from the first end portion 422a so as to reach the second end portion 422b. Therefore, the cover main body 422 can be separated into two members, in the same way as the third modification of the first embodiment.

A cover disposing portion 422e is formed concavely in a U shape as seen in a plan view. The cover disposing portion 422e extends to the second end portion 422b in the bottom surface of the second portion 422d. The front side portions of a cover member 430 and an additional cover member 530 are disposed on the cover disposing portion 422e.

The fixing mechanism 432 comprises at least one first fixing member 432a, and at least one second fixing member 432b. The first fixing member 432a is a member for fixing the first edge portion 426a to the bracket main body 414a. The second fixing member 432b is a member for fixing the second edge portion 426b to the bracket main body 414a. In the second embodiment, the first fixing member 432a and the second fixing member 432b are screw members, such as countersunk screws or round head screws. One first fixing member 432a is provided, and two second fixing members 432b are provided. The single first fixing member 432a extends through a first screw penetrating portion 426f formed on a first edge portion 426a. The single first fixing member 432a is screwed into a screw hole 414e in the middle in the front and rear direction of the left side surface 414d of the bracket main body 414a. The two second fixing members 432b extend through two second screw penetrating portions 426g formed on a second edge portion 426b. The two second fixing members 432b are screwed into respective screw holes 414e disposed at the two ends in the front and rear direction of the left side surface 414d of the bracket main body 414a. The first screw penetrating portion 426f is formed on an intermediate portion of the first edge portion 426a, so as to be more recessed than the outer surface of the cover main body 422. The first screw penetrating portion 426f protrudes towards the second edge portion 426b. The second screw penetrating portions 426g are formed at the two ends of the second edge portion 426b, so as to be more recessed than the outer surface of the cover main body 422. The second screw penetrating portions 426g protrude towards the first edge portion 426a. The second screw penetrating portions 426g are disposed on both sides of the first screw penetrating portion 426f. The rear side portion of the cover member 430 is disposed on the above recessed portion.

The additional fixing mechanism 532 comprises at least one third fixing member 532a, and at least one fourth fixing member 532b. The third fixing member 532a is a member for fixing the third edge portion 526a to the bracket main body 414a. The fourth fixing member 532b is a member for fixing the fourth edge portion 526b to the bracket main body 414a. In the second embodiment, the third fixing member 532a and the fourth fixing member 532b are screw members, such as countersunk screws or round head screws. One third fixing member 532a is provided, and two fourth fixing members 532b are provided. The single third fixing member 532a extends through a third screw penetrating portion 526f formed on a third edge portion 526a. The single third fixing member 532a is screwed into a screw hole 414e in the middle in the front and rear direction of the right side surface 414c of the bracket main body 414a. The two fourth fixing members 432b extend through two fourth screw penetrating portions 526g formed on a fourth edge portion 526b. The two fourth fixing members 432b are screwed into respective screw holes 414e disposed at the two ends in the front and rear direction of the right side surface 414c of the bracket main body 514a. The third screw penetrating portion 526f is formed on an intermediate portion of the third edge portion 526a, so as to be more recessed than the outer surface of the cover main body 422. The third screw penetrating portion 526f protrudes towards the fourth edge portion 526b. The fourth screw penetrating portions 526g are formed at the two ends of the fourth edge portion 526b, so as to be more recessed than the outer surface of the cover main body 422. The fourth screw penetrating portions 526g protrude towards the third edge portion 526a. The fourth screw penetrating portions 526g are disposed on both sides of the third screw penetrating portion 526f. The rear side portion of the additional cover member 530 is disposed on the above recessed portion.

The cover member 430 is provided to cover the opening part 426, and the additional cover member 530 is provided to cover the additional opening part 526. In the second embodiment, the cover member 430 and the additional cover member 530 are synthetic resin made, and are integrally provided. The cover member 430 is disposed on the opening part 426 and the cover disposing portion 422e of the cover main body 422. In the opening part 426, the cover member 430 extends to a first end via the recessed outer surfaces of the first screw penetrating portion 426f and the second screw penetrating portions 426g. The cover member 430 comprises positioning pins 430a which snap-fit into two positioning holes 414f on the left side surface 414d. The positioning pins 430a are on the inner surface of the cover member 430.

The additional cover member 530 is disposed on the opening part 526 and the cover disposing portion 422e of the cover main body 422. In the additional opening part 526, the additional cover member 530 extends to the first end via the recessed outer surfaces of the third screw penetrating portion 526f and the fourth screw penetrating portions 526g. The additional cover member 530 comprises positioning pins 530a which snap-fit into two positioning holes 414f on the right side surface 414c. The positioning pins 530a are on the inner surface of the cover member 530.

In a bracket cover 416 of the above configuration, the bracket cover 416 is directly fixed to the bracket 414. Accordingly, even if the user grips the bracket cover 416, the bracket cover 416 becomes less likely to shift with respect to the bracket 414.

Meanwhile, a coupling mechanism are not disclosed in the second embodiment for coupling the first edge portion 426a and the second edge portion 426b, and an additional coupling mechanism for coupling the third edge portion 526a and the fourth edge portion 526b. However, at least one of the coupling mechanism and the additional coupling mechanism can be provided to the bracket cover 416 of the second embodiment. For example, a coupling mechanism can be configured by providing an engagement portion to the first screw penetrating portion 426f and the second screw penetrating portions 426g disposed side-by-side in the front and rear direction so that the first edge portion 426a and the second edge portion 426b do not move in separating directions. Additionally, an additional coupling mechanism can be configured by providing an engagement portion to the third screw penetrating portion 526f and the fourth screw penetrating portions 526g disposed side-by-side in the front and rear direction so that the third edge portion 526a and the fourth edge portion 526b do not move in separating directions.

Third Embodiment

Figure 10:
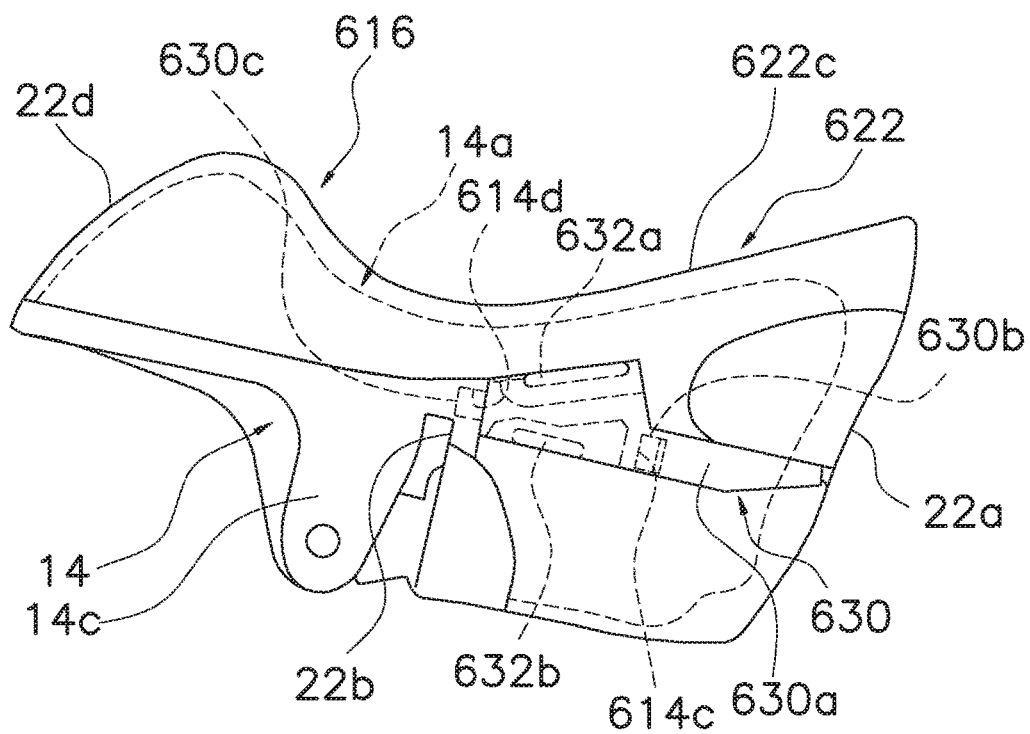
FIG. 10 is a side elevational view of a bracket having a bracket cover disposed on the bracket according to a third embodiment.
Figure 11:
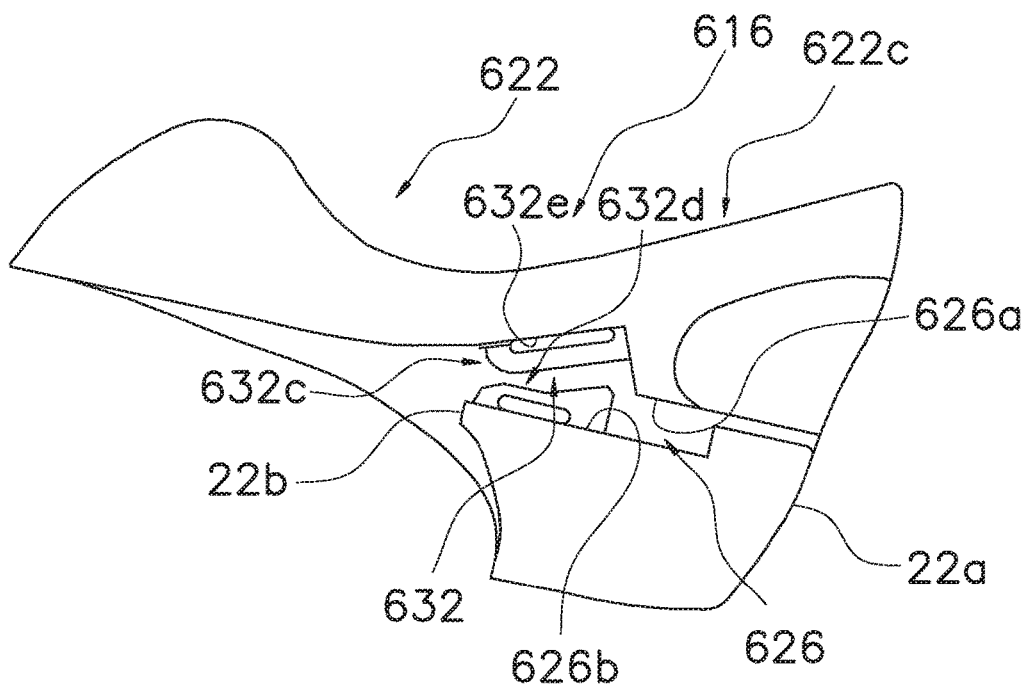
FIG. 11 is a side elevational view, corresponding to FIG. 2 of the first embodiment, of the bracket cover according to the third embodiment.

A bracket cover 616 according to the third embodiment is shown in FIGS. 10 and 11. The bracket cover 616 comprises a cover main body 622, a fixing mechanism 632, and a cover member 630. The bracket main body 14a comprises a first recess 614c and a second recess 614d for snap fitting of the cover member 630 on a surface facing an opening part 626, which will be described below.

The cover main body 622 comprises an elastic material such as synthetic resin, including synthetic rubber. The cover main body 622 has a first end portion 22a and a second end portion 22b. The cover main body 222 comprises a first portion 622c and a second portion 22d. The first portion 622c is formed in a tubular shape between the first end portion 22a and the second end portion 22b. In a state in which the bracket cover 16 is attached to the bracket 14, the first end portion 22a is disposed on a rear side in the front and rear direction of a bicycle with respect to the second end portion 22b. The cover main body 622 is fixedly attached to the outer perimeter portion of the bracket main body 14a.

The cover main body 622 comprises an opening part 626 in the first portion 622c. A first edge portion 626a and a second edge portion 626b of the opening part 626 are separately provided in different shapes. The opening part 626 is formed on a face that faces inward in the left and right direction of a bicycle, in a state in which the bracket cover 616 is attached to the bracket 14. The opening part 626 extends from at least one of the first end portion 22a and the second end portion 22b to form a first edge portion 626a and a second edge portion 626b. In the third embodiment, the opening part 626 extends from the first end portion 22a so as to reach the second end portion 22b. The opening part 626 is formed so that the first edge portion 626a and the second edge portion 626b are greatly separated. The first edge portion 626a and the second edge portion 626b are formed in different shapes.

The fixing mechanism 632 comprises a first protrusion 32a and a second protrusion 632b shown in FIG. 10, and a first engagement portion 632c and a second engagement portion 632b shown in FIG. 11. The first protrusion 632a and the second protrusion 632b protrude from the bracket main body 14a within the opening part 626. The first protrusion 632a is disposed close to the first edge portion 626a on the inner surface in the left and right direction of the bracket main body 14a. The second protrusion 632b is disposed close to the second edge portion 626b of the opening part 626 on the inner surface in the left and right direction of the bracket main body 14a. The first engagement portion 632c comprises a slit 632e for elastically engaging with the first protrusion 632a. The first engagement portion 632c is attached to a first portion 622c so as to be disposed from the first edge portion 626a to the opening part 626. The second engagement portion 632d comprises a slit 632f for elastically engaging with the second protrusion 632b. The second engagement portion 632d is attached to the first portion 622c so as to be disposed from the second edge portion 626b to the opening part 626.

The cover member 630 is, for example, a synthetic resin made plate-like member for covering the opening part 626. The cover member 630 comprises a cover portion 630a, a first leg portion 630b, and a second leg portion 630c. The cover portion 630a comprises an outer surface which substantially contacts the first edge portion 626a and the second edge portion 626b, and extends from a first portion 22c. The first leg portion 630b extends in a direction orthogonal to the cover portion 630a, on one end of the cover member 630. The distal end of the first leg portion 630b is snap fitted to the first recess 614c to position and stop the cover member 630. The second leg portion 630c protrudes from a second end on the opposite side of a first end of the cover portion 630a toward a direction away from the first end. The second leg portion 630c is engaged with the second recess 614d and regulates the movement of the cover member 630 in the direction away from the bracket main body 14a.

In a bracket cover 616 of the above configuration, the bracket cover 616 can be detached by detaching the cover member 630, detaching the first engagement portion 632c from the first protrusion 632a, and detaching the second engagement portion 630d from the second protrusion 632b. Accordingly, the bracket cover 616 can be attached to and detached from the bracket main body 14a without using tools. As a result, the attaching/detaching of the bracket cover 616 becomes easier.

Meanwhile, a coupling mechanism is not provided in the third embodiment, but the first edge portion 626a and the second edge portion 626b can be coupled by the cover member 630. For example, the cover member 630 can have two protrusions that engage with each of the first engagement portion 632c and the second engagement portion 632d. In this case, one of the protrusions of the cover member 630 and the first protrusion 632a can be engaged with the first engagement portion 632c, and the other of the protrusions of the cover member 630 and the second protrusion 632b can be engaged with the second engagement portion 632d, collectively. Additionally, each of the protrusions can be individually engaged with an engagement portion.

Fourth Embodiment

Figure 12:
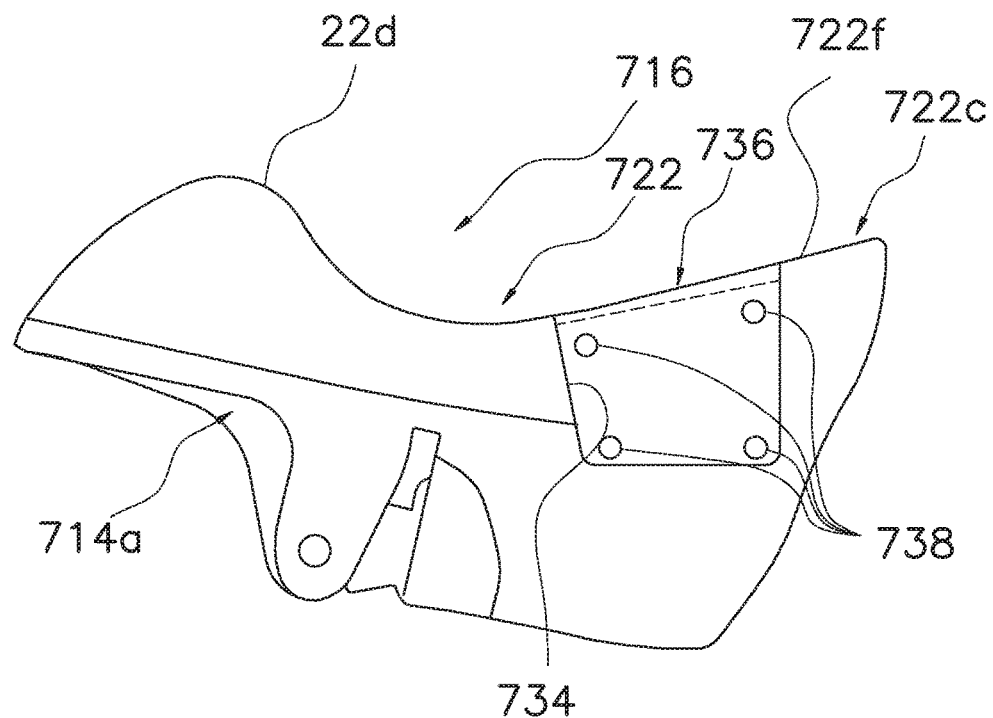
FIG. 12 is a side elevational view of a bracket having a bracket cover disposed on the bracket according to a fourth embodiment.
Figure 13:
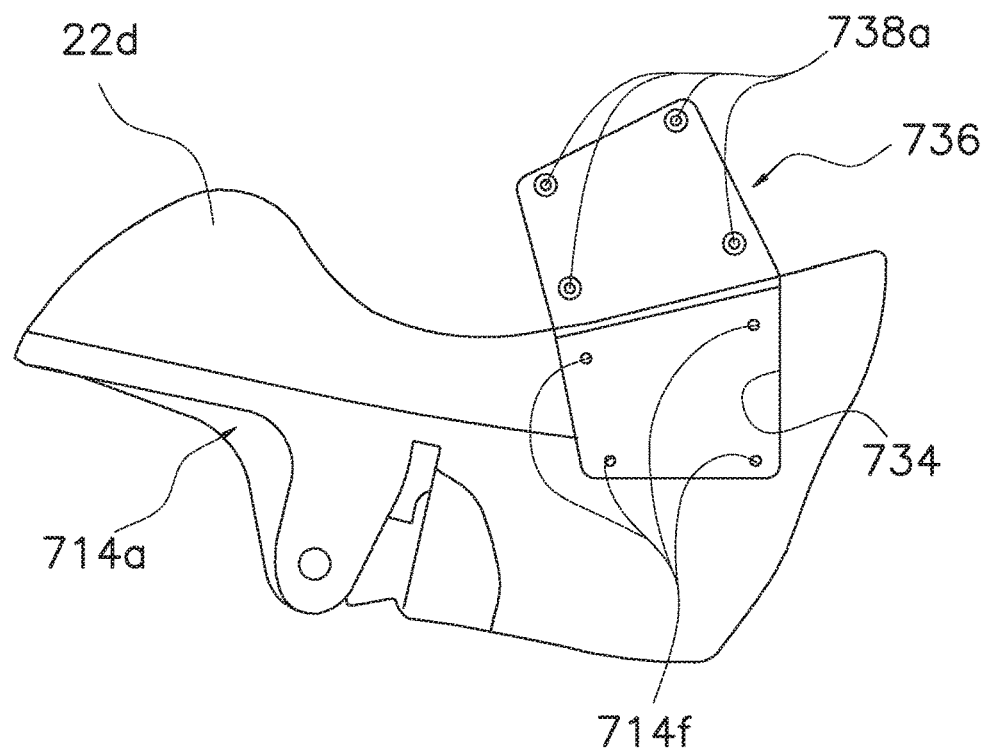
FIG. 13 is a side elevational view of the bracket and the bracket cover of the fourth embodiment with the bracket cover in an opened state.

As shown in FIGS. 12 and 13, a bracket cover 716 of the fourth embodiment comprises a cover main body 722, an opening 734, and an opening cover member 736. The cover main body 722 comprises an elastic material such as synthetic resin, including synthetic rubber. The cover main body 722 comprises a first portion 722c formed in a tubular shape and a second portion 22d. The cover main body 722 is fixedly attached to the outer perimeter portion of a bracket main body 714a.

The opening 734 is formed on the outer perimeter of the cover main body 722. In the fourth embodiment, the opening 734 is formed so as to include a ridge line 722f of the cover main body 722. The opening cover member 736 is provided integrally with the cover main body 722. The opening cover member 736 is detachably fixed to the bracket main body 714a by a plurality (for example, four) of engagement members 738. The engagement members 738 provided to the opening cover member 736. The engagement member 738 is a snap-button shaped member comprising an engagement protrusion 738a. The engagement holes 714f are formed on the bracket main body 714a for elastically engaging with the engagement protrusions 738a.

In the bracket cover 716 according to the fourth embodiment of the above configuration, since the opening cover member 736 is formed on the outer perimeter of the cover main body 722, the outer perimeter portion of the bracket main body 714a can be easily exposed. Accordingly, maintenance of equipment provided to the bracket main body 714a becomes easy.

Fifth Embodiment

Figure 14:
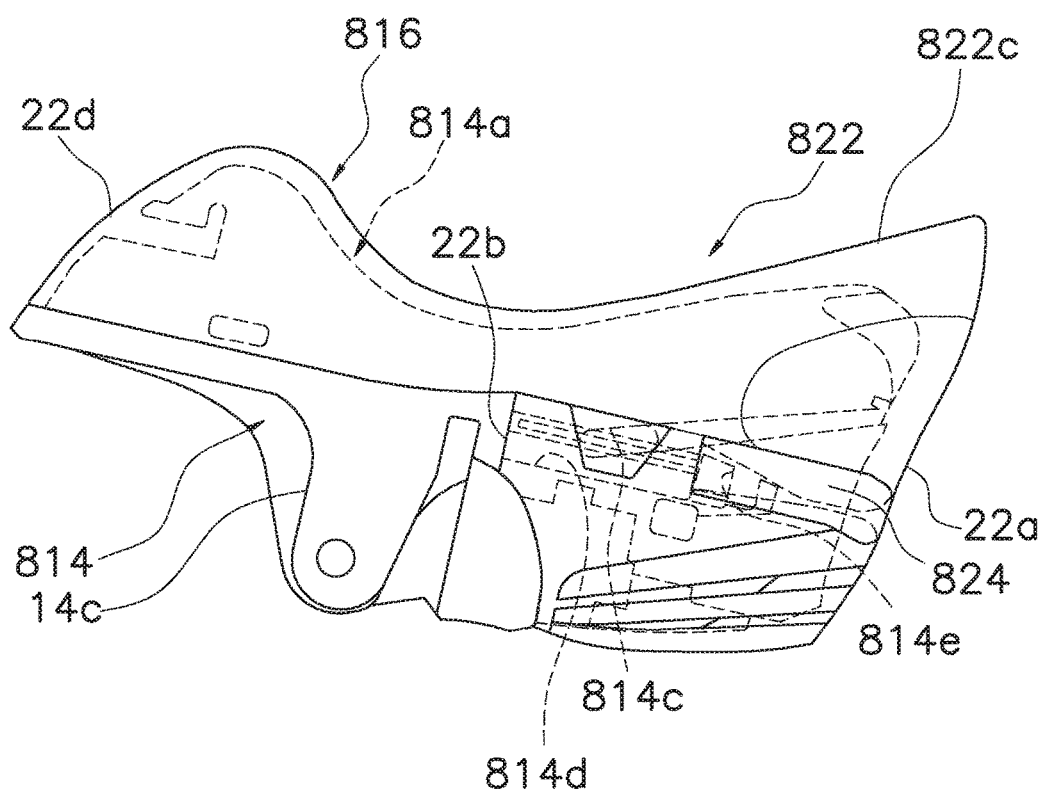
FIG. 14 is a side elevational view of a bracket having a bracket cover disposed on the bracket according to a fifth embodiment.

As shown in FIG. 14, a bracket cover 816 according to the fifth embodiment is attachable to a bracket main body 814a. The bracket cover 816 covers at least a portion of the bracket main body 814a. In the fifth embodiment, the bracket cover 816 is formed to substantially cover the entire bracket main body 814a. The bracket cover 816 comprises a cover main body 822 and a coupling mechanism 824. The bracket main body 814a comprises a first positioning part 814c and a second positioning part 814d for the positioning of the coupling mechanism 824. The first positioning part 814c is configured from either a recess or a protrusion. In the fifth embodiment, the first positioning part 814c is configured from a recess. The second positioning part 814d is configured from a difference in level in which a lower portion protrudes to the front side in a direction orthogonal to the paper surface in FIG. 14. Additionally, the bracket main body 814a comprises a fitted part 814e into which the coupling mechanism 824 can be fitted. The fitted part 814e is configured from either a recess or a protrusion. In the fifth embodiment, the fitted part 814e is configured from a recess.

Figure 15:
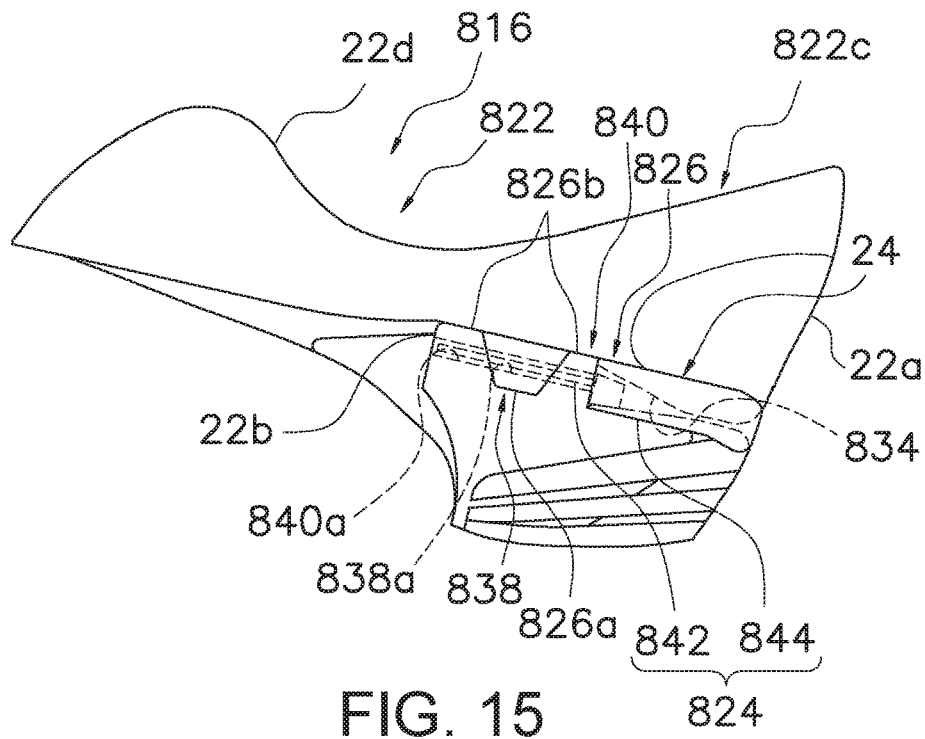
FIG. 15 is a side elevational view, corresponding to FIG. 2 of the first embodiment, of the bracket cover according to the fifth embodiment.
Figure 16:
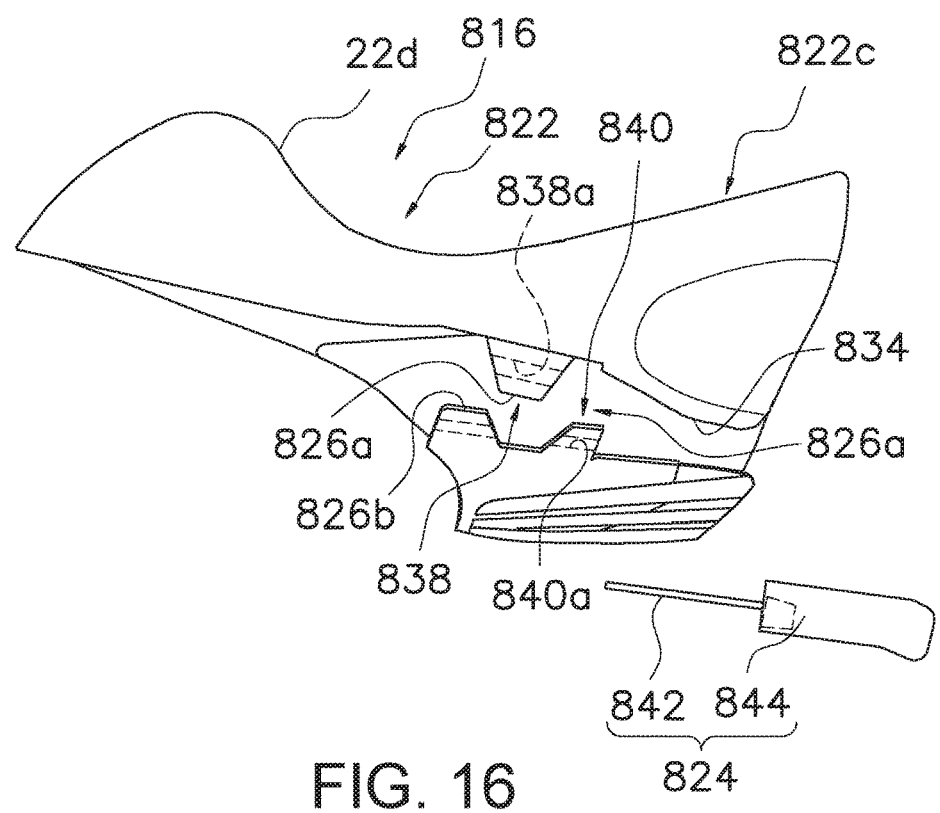
FIG. 16 is a side elevational view, corresponding to FIG. 3 of the first embodiment of the bracket cover according to the fifth embodiment.
Figure 17:
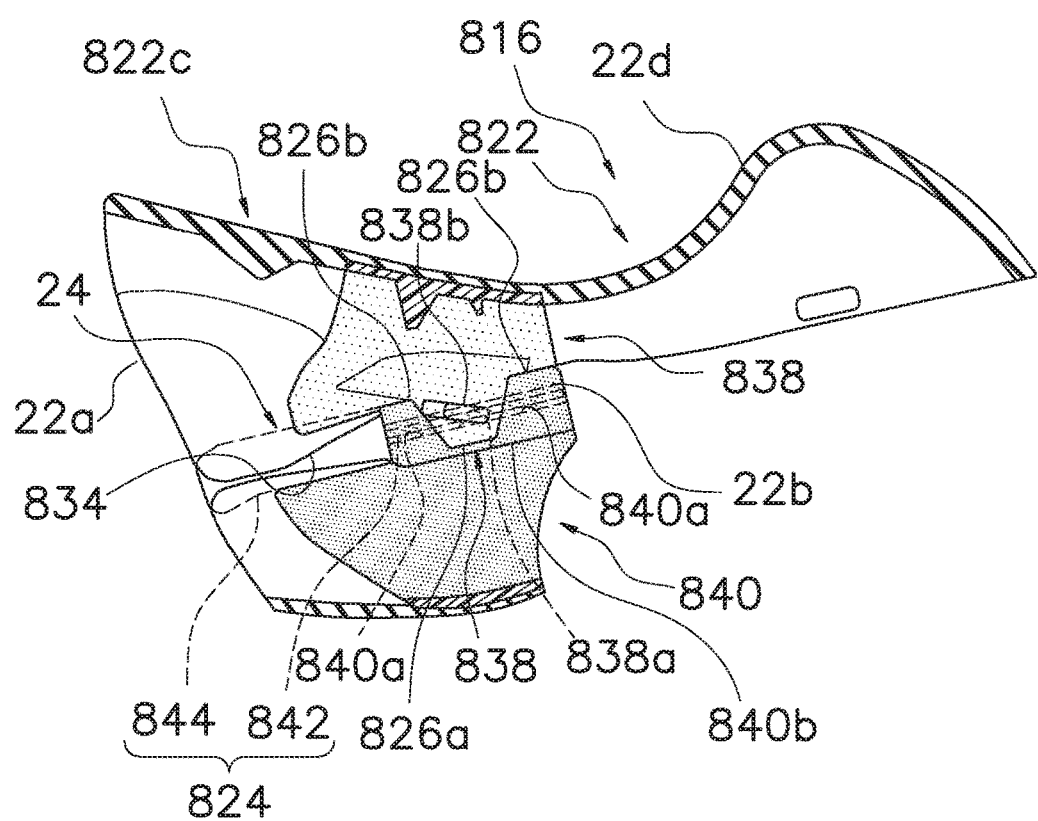
FIG. 17 is a cross-sectional view of the bracket cover according to the fifth embodiment.

In FIGS. 15 to 17, the cover main body 822 comprises an elastic material such as synthetic resin, including synthetic rubber. The cover main body 822 has a first end portion 22a and a second end portion 22b. The cover main body 822 comprises a first portion 822c and a second portion 22d. The first portion 822c is formed in a tubular shape between the first end portion 22a and the second end portion 22b. The second portion 22d is disposed on the front of the second end portion 22b. The second portion 22d covers the front portion of the bracket main body 814a from above. The cover main body 822 comprises an openable and closable opening part 826 in the first portion 822c. The opening part 826 is formed on a face that faces inward in the left and right direction of a bicycle, in a state in which a bracket cover 816 is attached to a bracket 814. The opening part 826 extends from at least one of the first end portion 22a and the second end portion 22b to form a first edge portion 826a and a second edge portion 826b. The opening part 826 comprises an opening 834 between a second edge portion 826d and the first end portion 22a. In the fifth embodiment, the opening part 826, including the opening 834, extends from the first end portion 22a to the second end portion 22b.

The cover main body 822 comprises a first pin insertion part 838, and second pin insertion parts 840 disposed on both sides of the first pin insertion part 838. The first pin insertion part 838 comprises a first edge portion 826a. The first pin insertion part 838 comprises a first pin insertion hole 838a. As shown by the coarse dots in FIG. 17, the first pin insertion part 838 is configured from synthetic resin, and extends to the inner perimeter side in the upper portion of the cover main body 822. The first pin insertion part 838 comprises a first positioning structure 838b for being positioned with respect to the bracket 814. The first positioning structure 838b is configured from, for example, a protrusion, and engages with the first positioning part 814c of the bracket 814.

The second pin insertion part 840 is configured to communicate with the first pin insertion part 838. The second pin insertion part 840 comprises a second edge portion 826b. The second pin insertion part 840 is configured from synthetic resin, and comprises a second pin insertion hole 840a that communicates with the first pin insertion hole 838a. As shown by the fine dots in FIG. 17, the second pin insertion part 840 is configured from synthetic resin, and extends to the inner perimeter side in the lower portion of the cover main body 822. The second pin insertion part 840 comprises a second positioning structure 840b for being positioned with respect to the bracket 814. The second positioning structure 840b is configured from, for example, a difference in level in which an upper portion protrudes to the front side in a direction orthogonal to the paper surface in FIG. 17, and engages with the first positioning part 814c of the bracket 814.

Since the first pin insertion part 838 and the second pin insertion part 840 are positioned by the first positioning structure 838b and the second positioning structure 840b described above, the coupling operation of the first edge portion 826a and the second edge portion 826b by the coupling mechanism 824 becomes easy to be carried out.

The cross sections of the first pin insertion hole 838a and the second pin insertion hole 840a are formed in an oval shape comprising a pair of linear portions disposed facing each other, and a pair of semicircular portions that connect both ends of the pair of linear portions. In the fifth embodiment, the first pin insertion hole 838a and the second pin insertion hole 840a are of the same size. The second edge portions 826b are provided on either side of the first edge portion 826a. The first pin insertion part 838 and the second pin insertion part 840 are configured so that the outer edges thereof are engaged by the unevenness.

The coupling mechanism 824 couples the first edge portion 826a and the second edge portion 826b. The coupling mechanism 824 comprises a pin 842 which is configured from a metal having elasticity, that can be inserted to the first pin insertion hole 838a and the second pin insertion hole 840a. The coupling mechanism 824 further comprises a base portion 844 configured from synthetic resin for holding the pin 842. The diameter of the pin 842 is slightly smaller than the diameter of the semicircular portion of the cross section of the second pin insertion hole 840a which communicates with the first pin insertion hole 838a. The distal end of the pin 842 is disposed in the second pin insertion hole 840a, which is to the front side in a state in which the pin 842 is inserted into the first pin insertion part 838 and the second pin insertion part 840.

Figure 18:
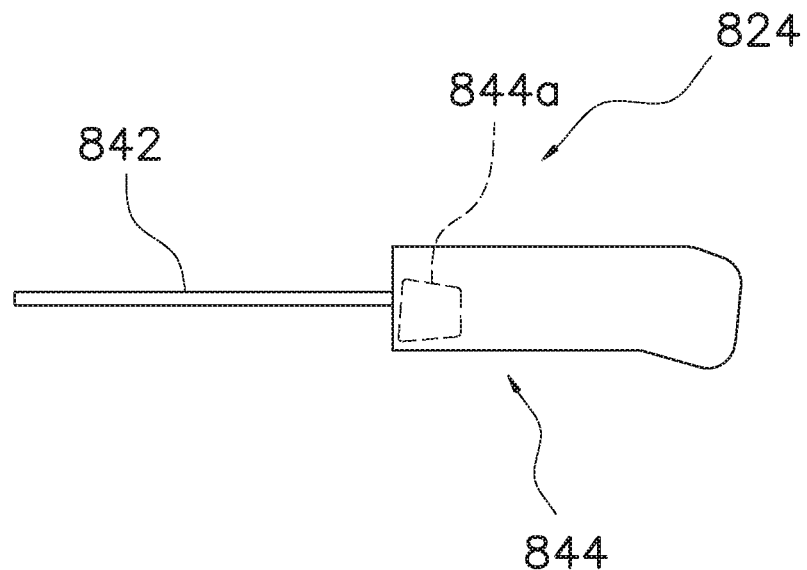
FIG. 18 is a side elevational view of a coupling mechanism of the bracket cover according to the fifth embodiment.
Figure 19:
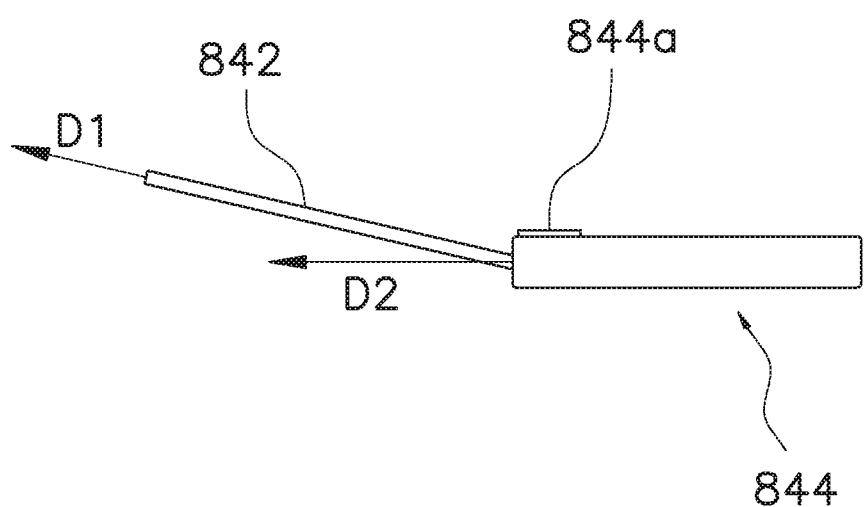
FIG. 19 is a top plan view of the coupling mechanism illustrated in FIG. 17.

As shown in FIGS. 15 and 17, the base portion 844 is formed in a generally rectangular shape having a size that covers the opening 834. Therefore, the base portion 844 also functions as an opening cover member. As shown in FIG. 18 and FIG. 19, the base portion 844 comprises a fitting part 844a configured to be fit into the fitted part 814e of the bracket 814. The fitting part 844a is configured from a protrusion that squarely protrudes on the surface on the side with the cover main body 822 of the base portion 844. The base portion 844 is coupled to the pin 842 so that the base portion 844 is biased to the bracket 814 side with respect to the first pin insertion part 838 and the second pin insertion part 840, in a state in which the pin 842 is inserted to the first pin insertion part 838 and the second pin insertion part 840. The pin 842 extends in a first direction D1, and the base portion 844 extends in a second direction D2 having a predetermined angle with respect to the first direction D1. Due to the pin 842 and the base portion 844 extending in different directions, the base portion 844 is biased towards the side with the bracket 814, in a state in which the pin 842 is inserted to the first pin insertion part 838 and the second pin insertion part 840. Accordingly, the fitting part 844a of the base portion 844 is engaged with the fitted part 814e of the bracket 814. Thus, the coupling mechanism 824 becomes less likely to fall out in the axial direction from the first pin insertion part 838 and the second pin insertion part 840.

In the bracket cover 816 of the fifth embodiment of the above configuration, the bracket cover 816 can be easily attached to and detached from the bracket 814, as well.

Other Embodiments

One embodiment of the present invention was described above, but the present invention is not limited to the above-described embodiment, and various modifications can be made without departing from the scope of the invention. Especially, the various embodiments and modifications described in the present specification can be freely combined according to necessity.

(a) In the first embodiment including the first modification and the second modification described above, a coupling mechanism or an additional coupling mechanism was configured from the zipper 28, 128, 228 or 328, but the present invention is not limited to this. For example, a coupling mechanism or an additional coupling mechanism can be configured from an elastic engagement structure, such as the snap button shown in the fourth embodiment or the snap fit shown in the third embodiment.

(b) In the above-described embodiments, the present invention was described using a bracket cover of the operating device 10, which is mounted on the right curved portion 12a of the handlebar 12; however, the present invention can be applied to the bracket cover of the operating device 10, which is mounted on the left curved portion 12b, as well.

(c) In the above-described embodiments, bracket cover of the operating device 10 which is connected with a control cable was disclosed, but the present invention is not limited to this. For example, the present invention can be applied to an operating device comprising a brake lever coupled to a brake device by liquid pressure piping, or a shifting lever connected to a gear shifting device by wireless or by wire, as well.

Figure 20:
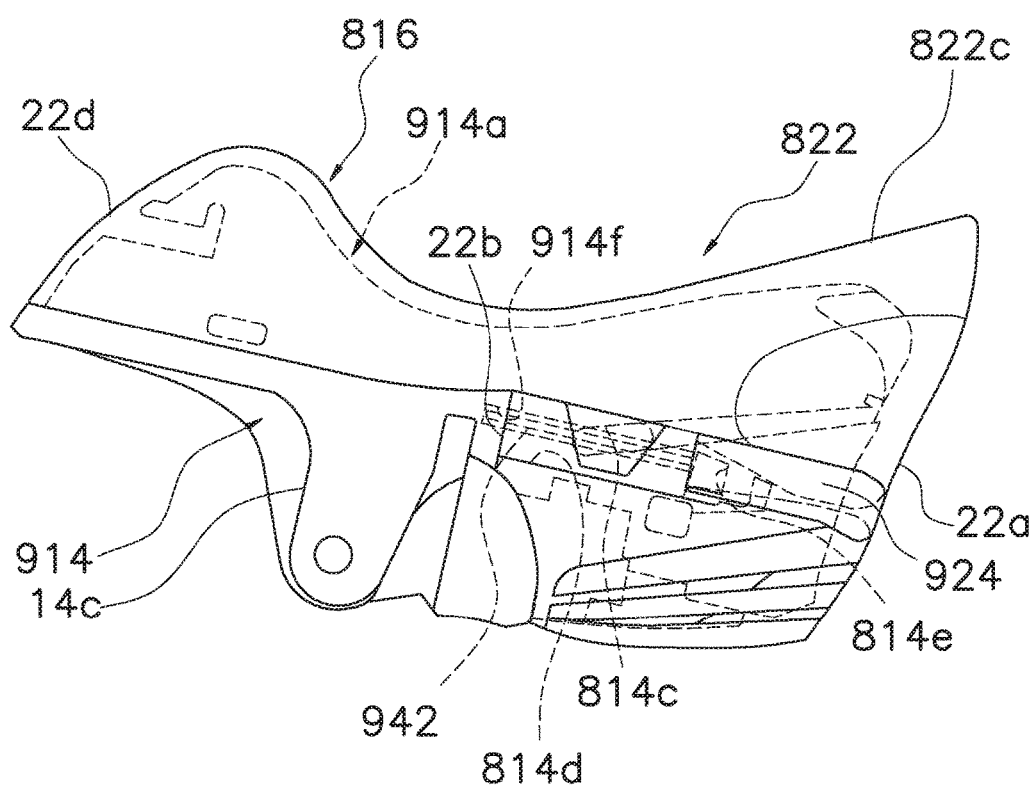
FIG. 20 is a side elevational view, corresponding to FIG. 14 of the fifth embodiment, of a bracket having a bracket cover disposed on the bracket according to a modification of the fifth embodiment.

(d) In the fifth embodiment, the distal end portion of the pin 842 was positioned to the second pin insertion part 840, but the present invention is not limited to this configuration. As shown in FIG. 20, it can be configured such that the circle end portion of a pin 942 is inserted to a bracket 914. In this case, a third pin insertion hole 914f into which the distal end portion of the pin 942 of a coupling mechanism 924 can be inserted is provided at a position opposed to the second pin insertion part 840 of a bracket main body 914a.

What is claimed is:

1. A bracket cover for covering at least a portion of a bracket that is attachable to a bicycle handlebar of a bicycle, the bracket cover comprising:
   a cover main body including a portion having a first edge portion and a second edge portion, the portion of the cover main body includes a first portion configured to cover a rear portion of the bracket from above and a second portion configured to cover a front portion of the bracket from above, the portion being an elastic material;
   a first fixing member configured to detachably fix the cover main body to a first side surface of an outer perimeter portion of the bracket at the first edge portion, the first fixing member being a separate member from the cover main body; and
   a second fixing member configured to detachably fix the cover main body to a second side surface of an outer perimeter portion of the bracket at a side edge portion, the second fixing member being a separate member from the cover main body.

2. The bracket cover according to claim 1, wherein the first edge portion includes a first opening that receives the first fixing member; and
   the second edge portion includes a second opening that receives the second fixing member.

3. The bracket cover according to claim 1, wherein the first fixing member includes a first screw member, and the second fixing member includes a second screw member.

4. The bracket cover according to claim 1, wherein the portion of the cover main body is U-shaped between the first edge portion and the second edge portion.

5. The bracket cover according to claim 1, wherein the first fixing member is screwed into a screw hole of the bracket in a state in which the bracket cover is attached to the bracket.

6. The bracket cover according to claim 1, wherein the first portion includes the first and second edge portions.

7. The bracket cover according to claim 6, wherein the first and second edge portions of the first portion are disposed below the second portion in a state in which the bracket is attached to the bicycle handlebar of the bicycle.

8. A bracket cover for covering at least a portion of a bracket that is attachable to a bicycle handlebar of a bicycle, the bracket cover comprising:
   a cover main body including a first portion formed in a tubular shape and a second portion configured to cover a front portion of the bracket from above, the first and second portions comprising an elastic material; and an engagement member configured to detachably fix the cover main body to a side surface of an outer perimeter portion of the bracket, the engagement member protruding from the cover main body into an opening of the bracket to form a snap fit connection with the bracket in a state in which the bracket cover is attached to the bracket.

9. The bracket cover according to claim 8, wherein the engagement member comprises an engagement protrusion.

10. The bracket cover according to claim 9, wherein the engagement member is a snap-button member.

11. The bracket cover according to claim 8, further comprising an additional engagement member configured to detachably fix the cover main body to the side surface of the outer perimeter portion of the bracket.

12. A bracket cover for covering at least a portion of a bracket that is attachable to a bicycle handlebar of a bicycle, the bracket cover comprising:

a cover main body configured to be attached to an outer perimeter portion of the bracket, the cover main body comprising an elastic material; and a cover member configured to be fixed to the bracket by a plurality of positioning pins, the cover member being a separate member from the cover main body, the cover member being disposed exteriorly over the cover main body in a state in which the bracket cover is attached to the bracket.

13. The bracket cover according to claim 12, wherein
the positioning pins includes a first positioning pin configured to engage a first side surface of the outer perimeter portion of the bracket, and a second positioning pin configured to engage a second side surface of the outer perimeter portion of the bracket in a state in which the bracket cover is attached to the bracket.

14. The bracket cover according to claim 12, wherein
the positioning pins are configured to snap-fit into holes of the outer perimeter portion of the bracket in a state in which the bracket cover is attached to the bracket.

15. The bracket cover according to claim 12, wherein
the cover main body includes a first edge portion configured to overlie a first side surface of the outer perimeter portion of the bracket and a second edge portion configured to overlie a second side surface of the outer perimeter portion of the bracket in a state in which the bracket cover is attached to the bracket, the cover member is located at the first and second edge portions.

16. The bracket cover according to claim 12, wherein
the cover main body includes a U-shaped portion.

17. The bracket cover according to claim 12, wherein
the cover main body includes a first portion configured to cover a rear portion of the bracket from above and a second portion configured to cover a front portion of the bracket from above, the first portion includes the first and second edge portions.

* * * * *